United States Patent
Hale

(10) Patent No.: US 11,747,028 B2
(45) Date of Patent: *Sep. 5, 2023

(54) COOLING DEVICE OPERATION

(71) Applicant: DELTA T, LLC, Lexington, KY (US)

(72) Inventor: Michael Craig Hale, Fortville, IN (US)

(73) Assignee: DELTA T, LLC, Lexington, KY (US)

( * ) Notice: Subject to any disclaimer, the term of this patent is extended or adjusted under 35 U.S.C. 154(b) by 196 days.

This patent is subject to a terminal disclaimer.

(21) Appl. No.: 16/994,761

(22) Filed: Aug. 17, 2020

(65) Prior Publication Data

US 2020/0378634 A1 Dec. 3, 2020

Related U.S. Application Data

(63) Continuation of application No. 15/632,333, filed on Jun. 24, 2017, now Pat. No. 10,760,800, which is a continuation-in-part of application No. 15/362,466, filed on Nov. 28, 2016, now Pat. No. 10,598,394.

(51) Int. Cl.
| | |
|---|---|
| *F24F 5/00* | (2006.01) |
| *F24F 6/04* | (2006.01) |
| *F24F 11/30* | (2018.01) |
| *F24F 120/10* | (2018.01) |
| *F24F 11/46* | (2018.01) |

(52) U.S. Cl.
CPC .............. *F24F 5/0035* (2013.01); *F24F 6/04* (2013.01); *F24F 11/30* (2018.01); *F24F 11/46* (2018.01); *F24F 2006/046* (2013.01); *F24F 2120/10* (2018.01); *F24F 2221/14* (2013.01)

(58) Field of Classification Search
CPC ...... F24F 5/0035; F24F 6/04; F24F 2006/046; F24F 2221/14
See application file for complete search history.

(56) References Cited

U.S. PATENT DOCUMENTS

| | | | | |
|---|---|---|---|---|
| 5,857,350 A | * | 1/1999 | Johnson ................ | F24F 5/0035 62/314 |
| 2013/0233005 A1 | * | 9/2013 | Gilbert .................. | F24F 5/0035 62/186 |

* cited by examiner

*Primary Examiner* — Tavia Sullens
(74) *Attorney, Agent, or Firm* — Dickinson Wright PLLC; Andrew D. Dorisio

(57) ABSTRACT

A cooling device includes a cover, a trough connected to the cover, and a fan circulating air that is received from sides of the cooling device. The area above the fan is enclosed by the cover. The cooling device also includes a pump for delivering liquid to one or more pads located in the trough. The cooling device also includes a sensor that controls operating of the fan and the pump.

3 Claims, 16 Drawing Sheets

COOLING DEVICE OPERATION

BACKGROUND

Building spaces, such as office spaces, restaurants, auditoriums, warehouse areas, and manufacturing shop floors may require cooling systems to provide comfortable temperature and humidity levels to individuals who are occupying those particular building spaces. However, these existing systems may continue to operate even though the building spaces are not occupied.

Outdoor areas, such as patio areas for restaurants, may also use cooling systems such as fans and evaporative coolers to provide temperature and humidity control to an occupied space. However, these existing systems may also operate even though spaces are not occupied.

DETAILED DESCRIPTION OF PREFERRED EMBODIMENTS

The following detailed description refers to the accompanying drawings. The same reference numbers in different drawings may identify the same or similar elements. Systems, devices, and/or methods described herein may allow for a cooling device (e.g., a device or a collection of devices) or an evaporative cooling device to provide a reduction to air temperature within a particular area/space. In embodiments, the cooling device or the evaporative cooling device may not operate a portion of all of its systems based on non-occupancy or occupancy of a particular area/space by living entities (e.g., human beings). In embodiments, the cooling device may be attached to the ceiling and may include a pump and/or fan. In alternate embodiments, an evaporative cooler may be placed on the ground (e.g., the floor).

Figure 1A:
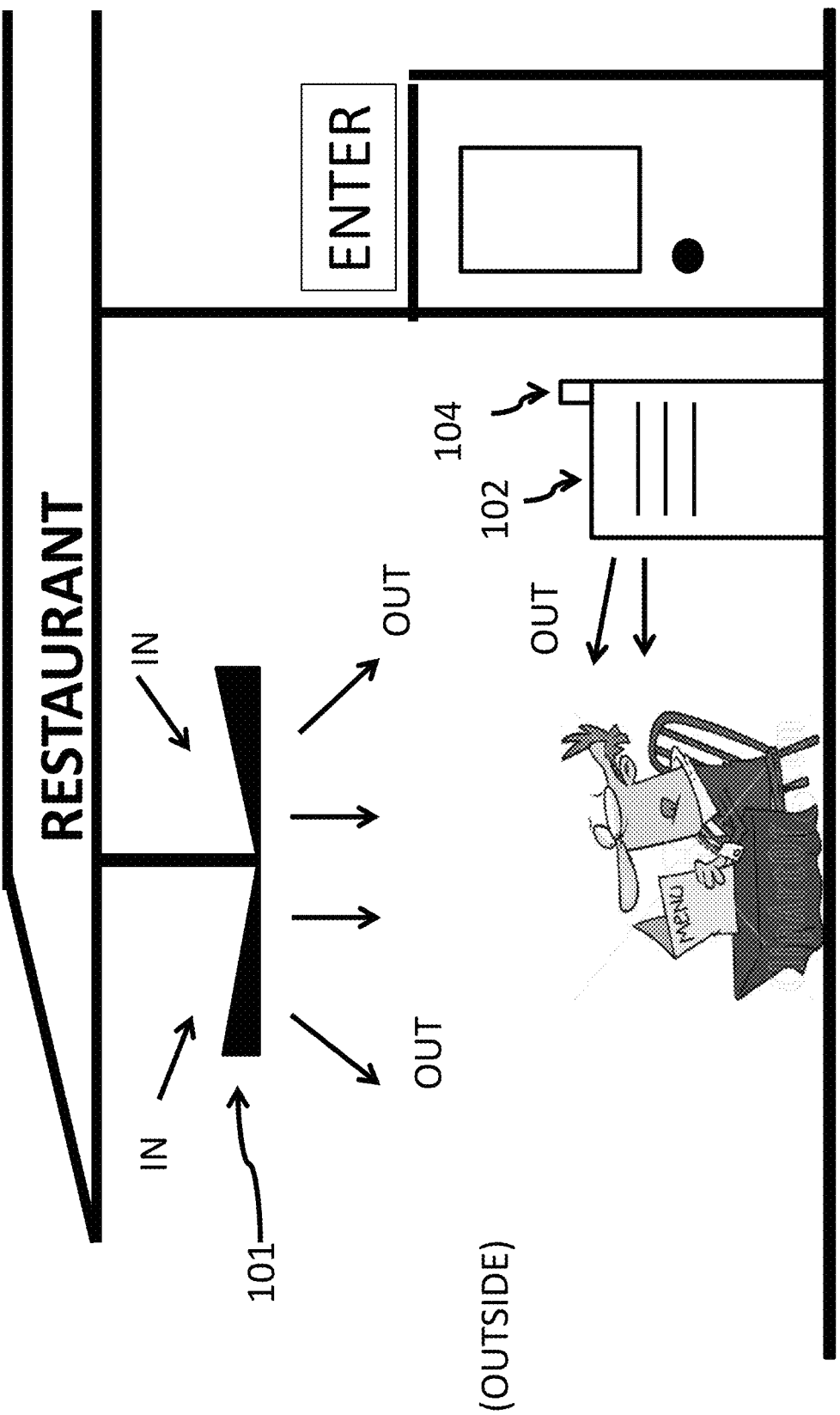
FIGS. 1A-1D diagrams of example environments in which systems and/or methods described herein may be implemented.

FIG. 1A describes an example of an individual sitting in an outside (e.g., an exterior area outside a building) patio area. To provide the comfortable temperature levels desired by the restaurant customers, the restaurant installs a ceiling fan 101 which circulates air from above the fan. However, since the ceiling fan only moves air, the ceiling fan is limited in how much cooling it can provide to the restaurant customers sitting in the patio area. Thus, the restaurant owners may also install evaporative cooling systems 102 which can be placed on ground. Evaporative cooling systems 102 may be able to cool the air temperature in the patio area. Also, as shown in FIG. 1A, sensor 104 is attached to evaporative cooling systems 102. Because there is a person sitting in the patio area, sensor 104 detects living entity's existence in the patio area and sends one or more communications to ceiling fan 101 and/or evaporative cooling systems 102 to operate and provide circulated air and/or conditioned air.

Figure 1B:
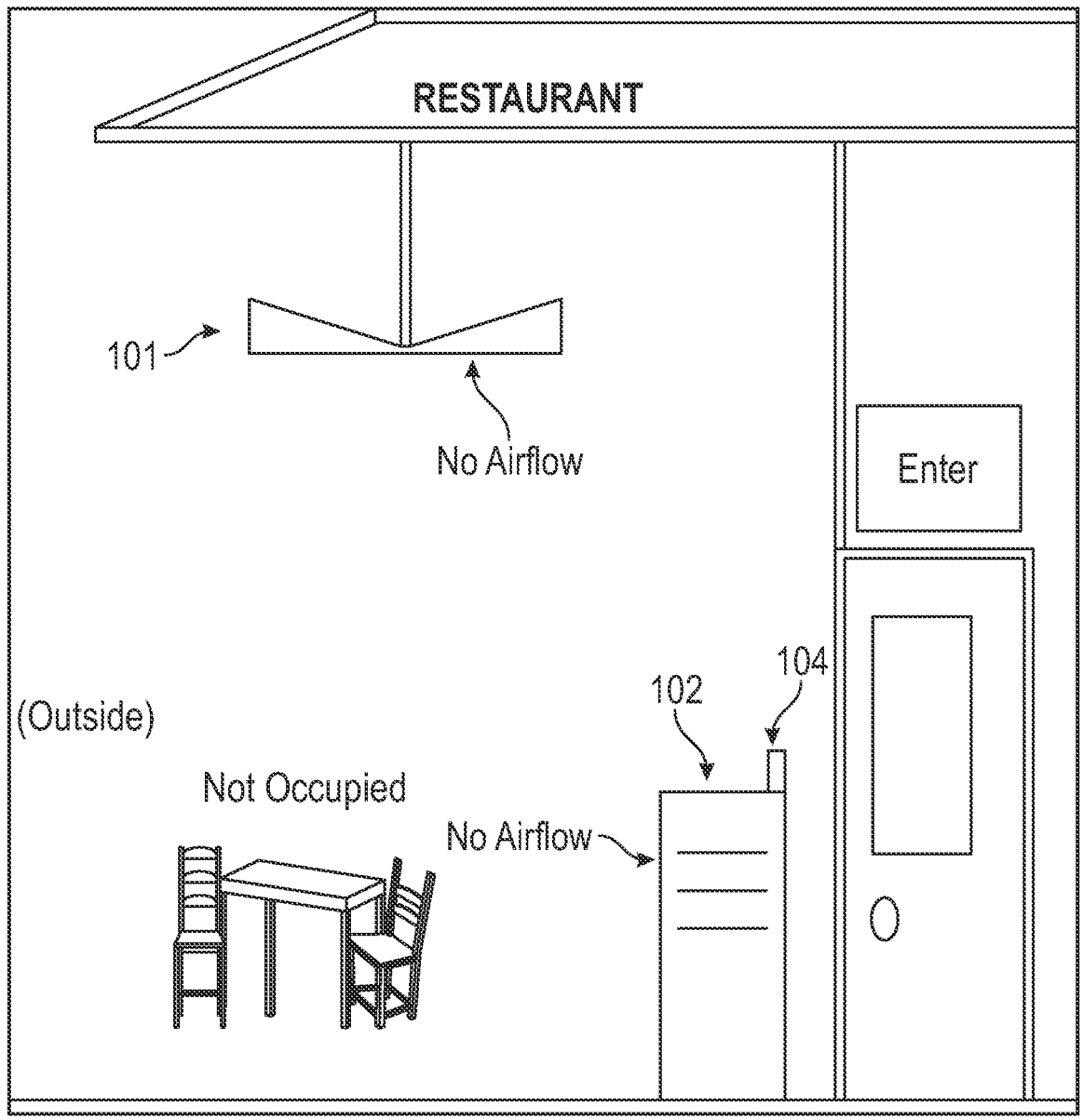

In contrast, FIG. 1B shows no-one sitting in the patio area. Accordingly, sensor 104 detects that there are no living entities (e.g., humans) in the patio area and sends one or more communications to ceiling fan 101 and/or evaporative cooling systems 102 to stop operation of both devices and to stop providing circulated air and/or conditioned air. While FIG. 1B describes sensor 104 as stopping the operation of both ceiling fan 101 and evaporative cooling systems 102, sensor 104 may only stop evaporative cooling systems 102 from operation and ceiling fan 101 may continue to operate even if there is no living entities present in the patio area.

Figure 1C:
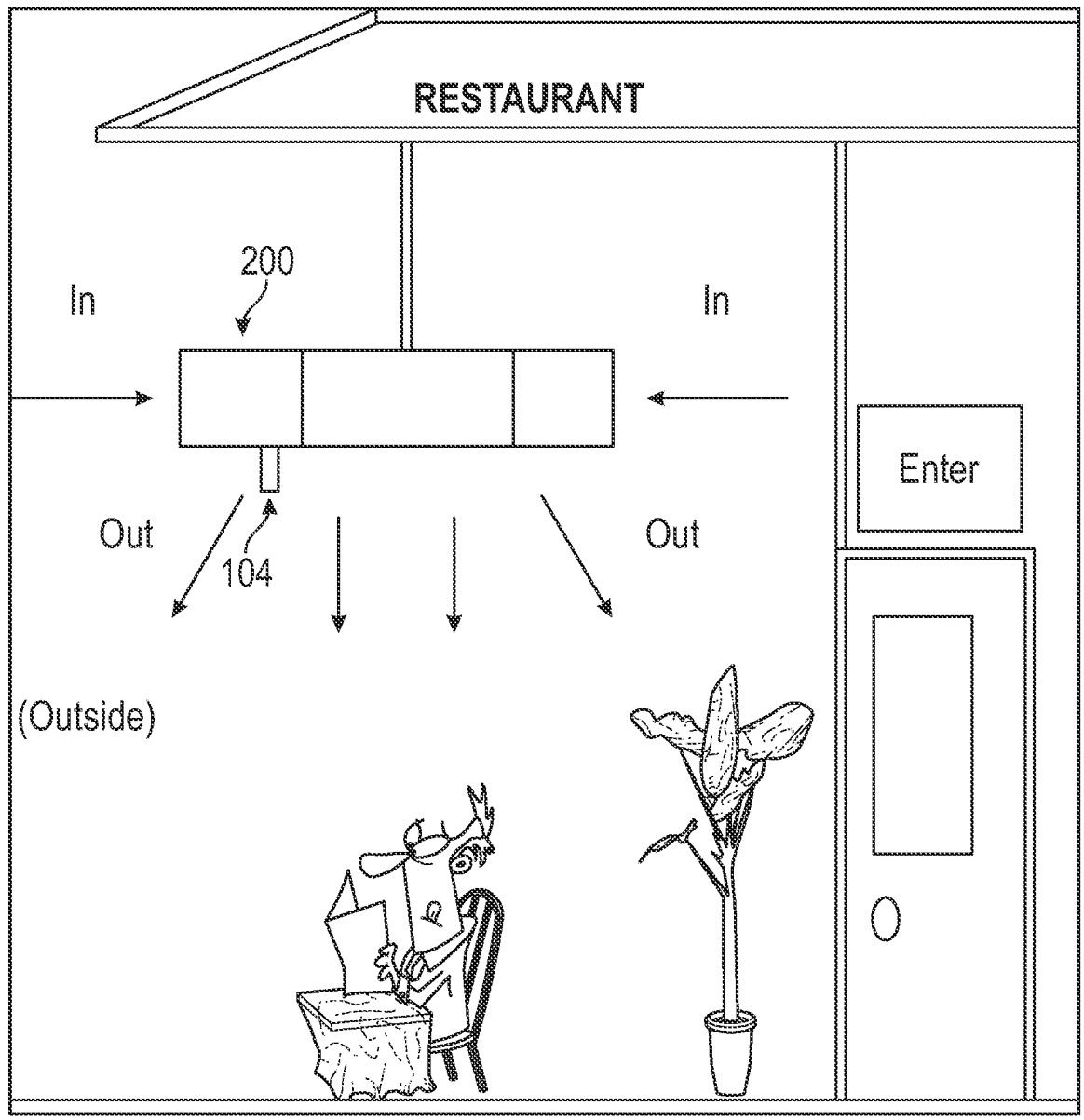

As shown in FIG. 1C, cooling device 200 is attached to the ceiling of the patio area and provides cooling to the patio area. Cooling device 200 incorporates the features of an evaporative cooling system, such as evaporative cooling system 102. As shown in FIG. 1C, air initially enters cooling device 200 from the sides of cooling device 200 and not from above cooling device 200. As shown in FIG. 1C, sensor 104 is attached to cooling device 200. In embodiments, the air that is supplied by cooling device 200 does not include any visible mist, hazy, or fog-like appearance. As shown in FIG. 1C, sensor 104 detects that there is a living entity in the patio area and sends one or more communications to cooling device 200 to operate based on occupancy within the patio area.

Figure 1D:
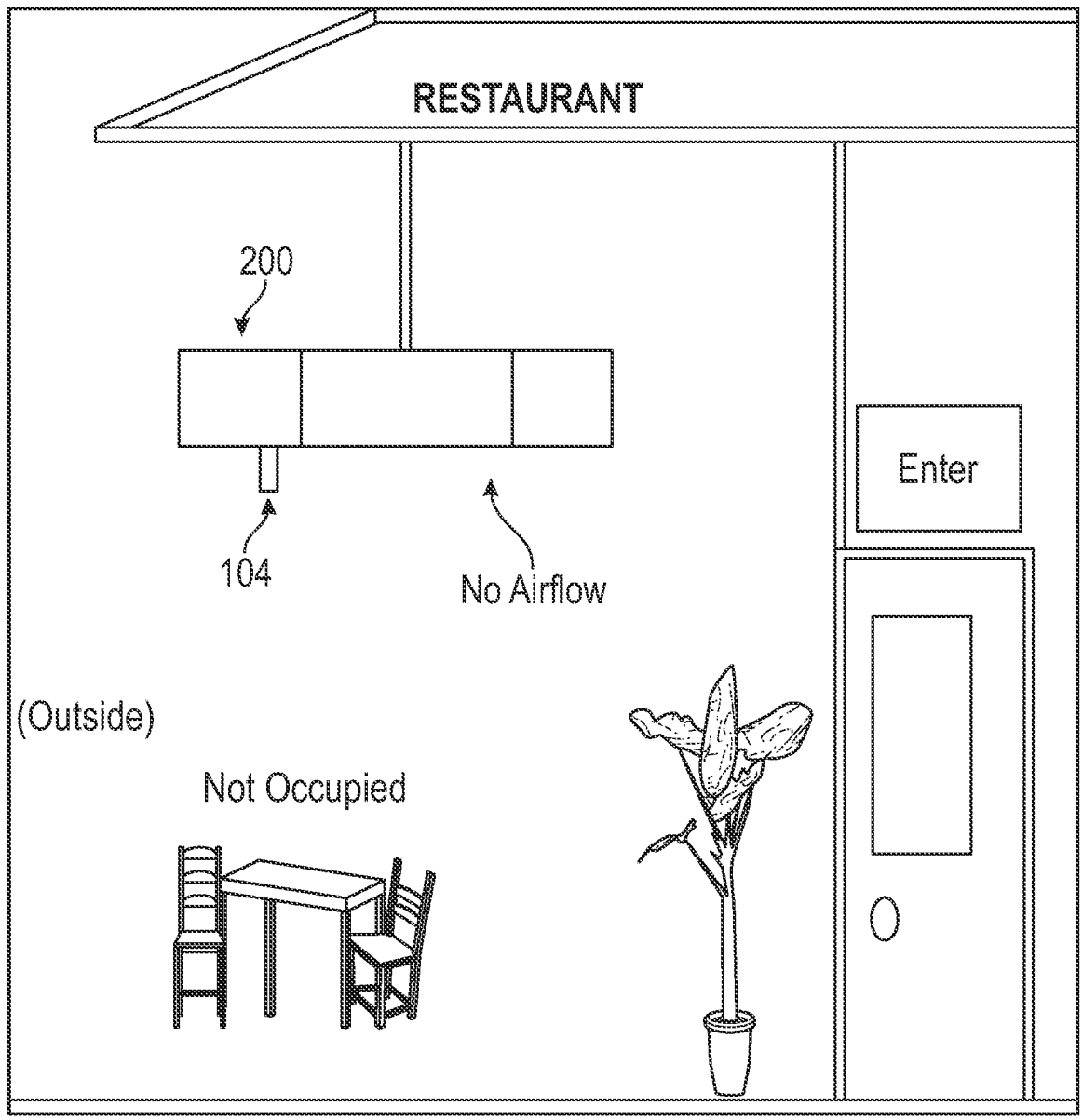

FIG. 1D shows that the patio area is no longer occupied by a living entity (e.g., a human). Accordingly, sensor 104 sends one or more communications to cooling device 200 to stop operation based on no living entity occupying the patio area. In embodiments, a living entity may be a human being, an animal or any living organism that can be detected by sensor 104.

Thus, the restaurant owner, another type of business, or a residential user may reduce energy usage (e.g., electric usage, natural gas usage, etc.) and water consumption by reducing the amount of operation time of a ceiling fan, an evaporative cooling system, or the cooling device. Accordingly, this may also reduce financial costs, such as energy costs and maintenance costs. Also, the reduction of energy usage and water consumption may also assist local governmental and utility companies managing scarce natural resources.

While the cooling device, or systems, have been described within the context of a restaurant, the cooling device (e.g. cooling device 200) may be used in other types of settings, such as in a residential home, interior spaces, other types of exterior spaces (e.g., picnic areas, outside work areas—farming activities, etc.), and/or any other space that may require a cooling device.

Figure 2:
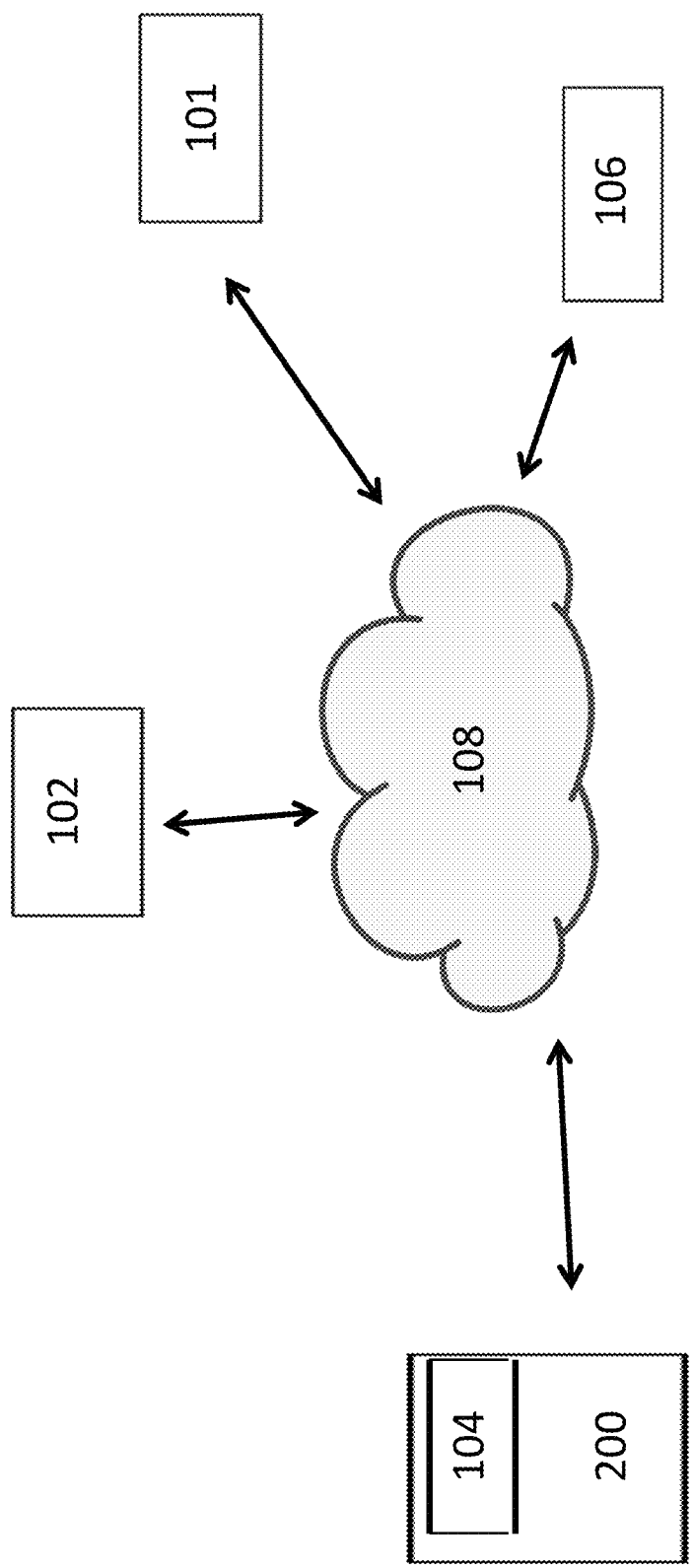
FIG. 2 is a network diagram of an example environment in which systems and/or methods described herein may be implemented.

FIG. 2 is a diagram of example environment 100 in which systems, devices, and/or methods described herein may be implemented. FIG. 2 shows ceiling fan 101, evaporative cooling device 102, sensor 104, computing device 106, network 108, and cooling device 200.

Ceiling fan 101 may be a device that rotates in a circular or elliptical fashion. In embodiments, ceiling fan 101 may have one or more blades, which extend from a central hub of ceiling fan 101, that rotate when mechanical power is provided to ceiling fan 101 via the central hub which may include a motor (e.g., electrical, mechanical, etc.) to rotate the one or more blades. While blades are described, the blades may also be known as paddles or by any other name. In embodiments, ceiling fan 101 may force, i.e., push, air from a room ceiling in a downward direction to a particular area. Evaporative cooling device 102 may be a device that provided evaporative cooling and is further described in FIG. 10.

Sensor 104 may be a device that determines occupancy of a particular area/space by living entities and turns on or off, using wireless and/or wireless communications, one or more devices in FIG. 2. In embodiments, sensor 104 may be a passive infrared sensor, an ultrasonic sensor, a microwave sensor, an audio detection, and/or a camera-based sensor. In embodiments, sensor 104 may include a time delay feature that turns off devices when sensor 104 determines that there is no occupancy for a particular amount time For example, sensor 104 may turn off a device after there is no occupancy for five minutes in a particular area. While FIG. 2 shows sensor 104 associated with cooling device 200, in embodiments, sensor 104 may also be physically connected to ceiling fan 101 and/or evaporative cooling device 102. In alternate embodiments, sensor 104 may not be physically connected to ceiling fan 101, evaporative cooling device 102 or cooling device 200. In embodiments, sensor 104 may control ceiling 101, evaporative cooling device 102, and/or cooling device 200. In embodiments, ceiling fan 101, evaporative cooling device 102, computing device 106, and/or cooling device 200 may include an override device that can override the sensor's control of one or more different devices. In embodiments, one or more sensors may communicate with other sensors. In embodiments, sensor 104 may communicated with other sensors via wireless communications and/or wired communications.

Computing device 106 may include one or more computing devices, or other types of computational or communications devices, that gather, process, search, store, and/or provide information in a manner described herein. Computing device 106 may store identifier information for different ceiling fans 101, evaporative cooling device 102, and/or cooling devices 200.

Network 108 may include a local area network (LAN), wide area network (WAN), a metropolitan network (MAN), a telephone network (e.g., the Public Switched Telephone Network (PSTN)), an ad hoc network, an intranet, the Internet, a satellite network, a GPS network, a fiber optic-based network, and/or combination of these or other types of networks. Additionally, or alternatively, network 108 may include a cellular network, a public land mobile network (PLMN), a second generation (2G) network, a third generation (3G) network, a fourth generation (4G) network, a fifth generation (5G) network, and/or another network. In embodiments, networks 108 may allow for devices described in FIGS. 1A-1D to electronically communicate (e.g., using emails, electronic signals, URL links, web links, electronic bits, fiber optic signals, wireless signals, wired signals, etc.) with each other so as to edit and/or create electronic communications events and/or electronic communications posts.

Cooling device 200 may be a type of cooling device that can provide evaporative cooling (by using a pump and fan associated with cooling device 200) or non-evaporative cooling (by using only a fan associated with cooling device 200). In embodiments, evaporative cooling includes a process for cooling (e.g., reducing temperature) air temperature through evaporation of a liquid, such as water. Cooling device 200 is further described in FIGS. 3-6, 7A, and 7B.

Figure 3:
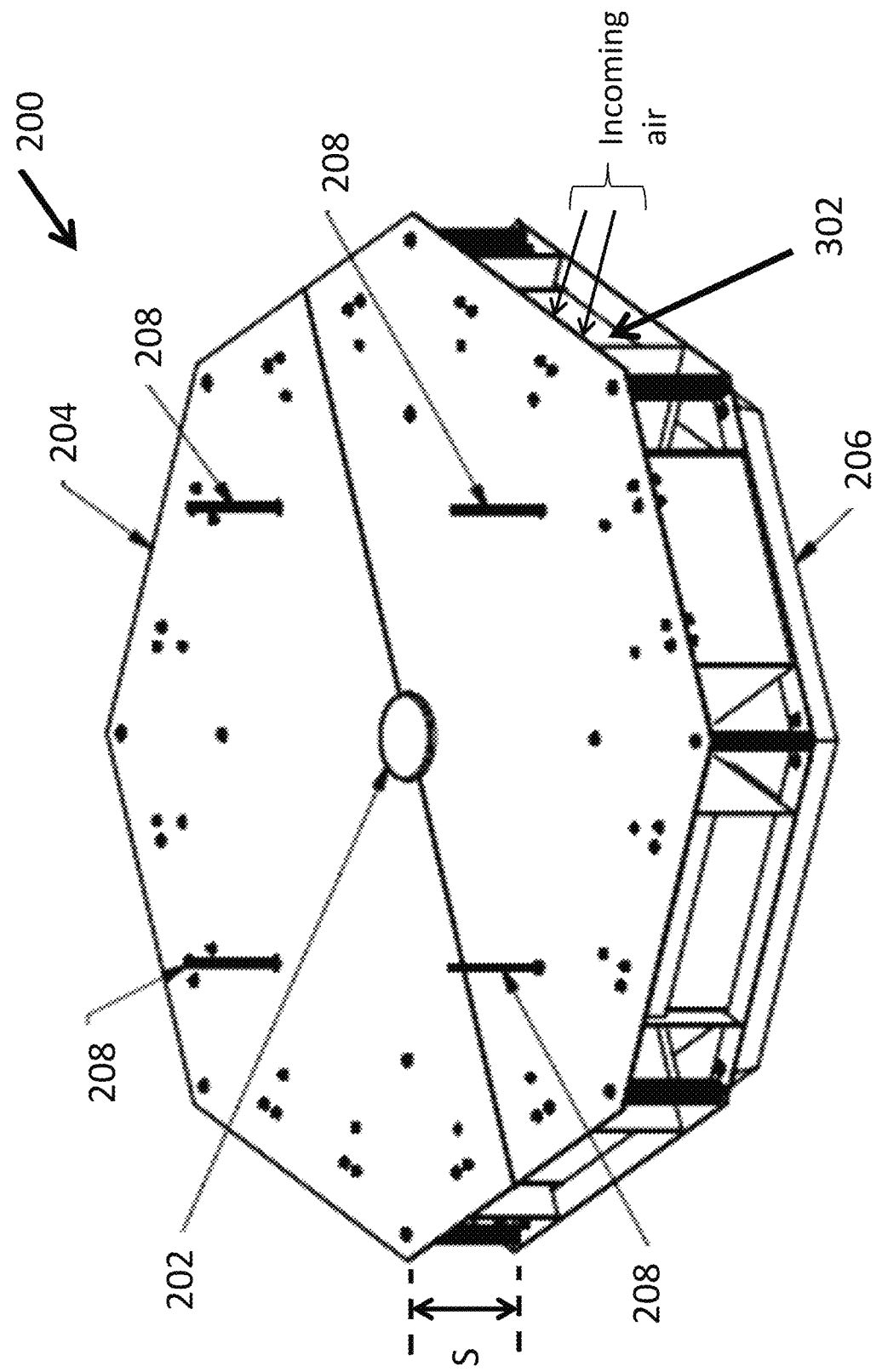
FIGS. 3 and 4 are diagrams of an example cooling device.

FIG. 3 is a diagram of example cooling device 200 (e.g., cooling device 110). FIG. 3 shows fan 202, cover 204, trough 206, connector 208, and pad 302 which is described in later figures. In embodiments, sensor 104 may be attached to cooling device 200.

In embodiments, cooling device 200, provides desired temperature levels without having to install multiple different devices, such as fans (e.g., ceiling fan 101), evaporative coolers (e.g., evaporative cooling device 102), and/or other types of cooling devices for the same area to be cooled. Furthermore, cooling device 200 does not generate any supplied air with mist, haze, a fog-like appearance, etc. Because multiple different types of devices are not installed, there is a reduction in costs associated with purchasing and maintenance. Instead, one or more cooling devices 200 can be purchased and used to provide the desired temperature levels. Furthermore, the reduction in other types of devices may also increase the flooring area to install decorative products (e.g., plants, statues), tables, barbeque system, manufacturing machines, and/or other items.

Fan 202 may be a device that rotates in a circular or elliptical fashion. In embodiments, fan 202 may have one or more blades, which extend from a central hub of fan 202, that rotate when mechanical power is provided to fan 202 via the central hub which may include a motor (e.g., electrical, mechanical, etc.) to rotate the one or more blades. While blades are described, the blades may also be known as paddles or by any other name. In embodiments, fan 202 may force, i.e., push, air in a particular direction. For example, if cooling device 200 is mounted from a ceiling, fan 202 may push air downwards and across the area below the ceiling. In embodiments, air may enter the sides of the cooling device. In embodiments, the sides may be perpendicular, or near perpendicular, to the area (e.g., ceiling) to which cooling device 200 is attached. Alternatively, for example, if cooling device 200 is mounted on a side wall (e.g., a vertical wall of a building), fan 2002 may push air across a particular area. In embodiments, fan 202 may push air (as shown as "incoming air" in FIG. 3) that has initially passed through pads, such as pads 302. In embodiments, fan 202 may be a variable speed driven fan or may be a constant speed driven fan. In embodiments, the blades of fan 202 may be manufactured from a metal material, a plastic material, or a hybrid material. In embodiments, fan 202 may have a motor size and blade dimensions that allow for minimizing noise, power requirements, vibration effects, and sizing of cover 204, trough 206, and pads 302 (as described in further drawings).

Figure 4:
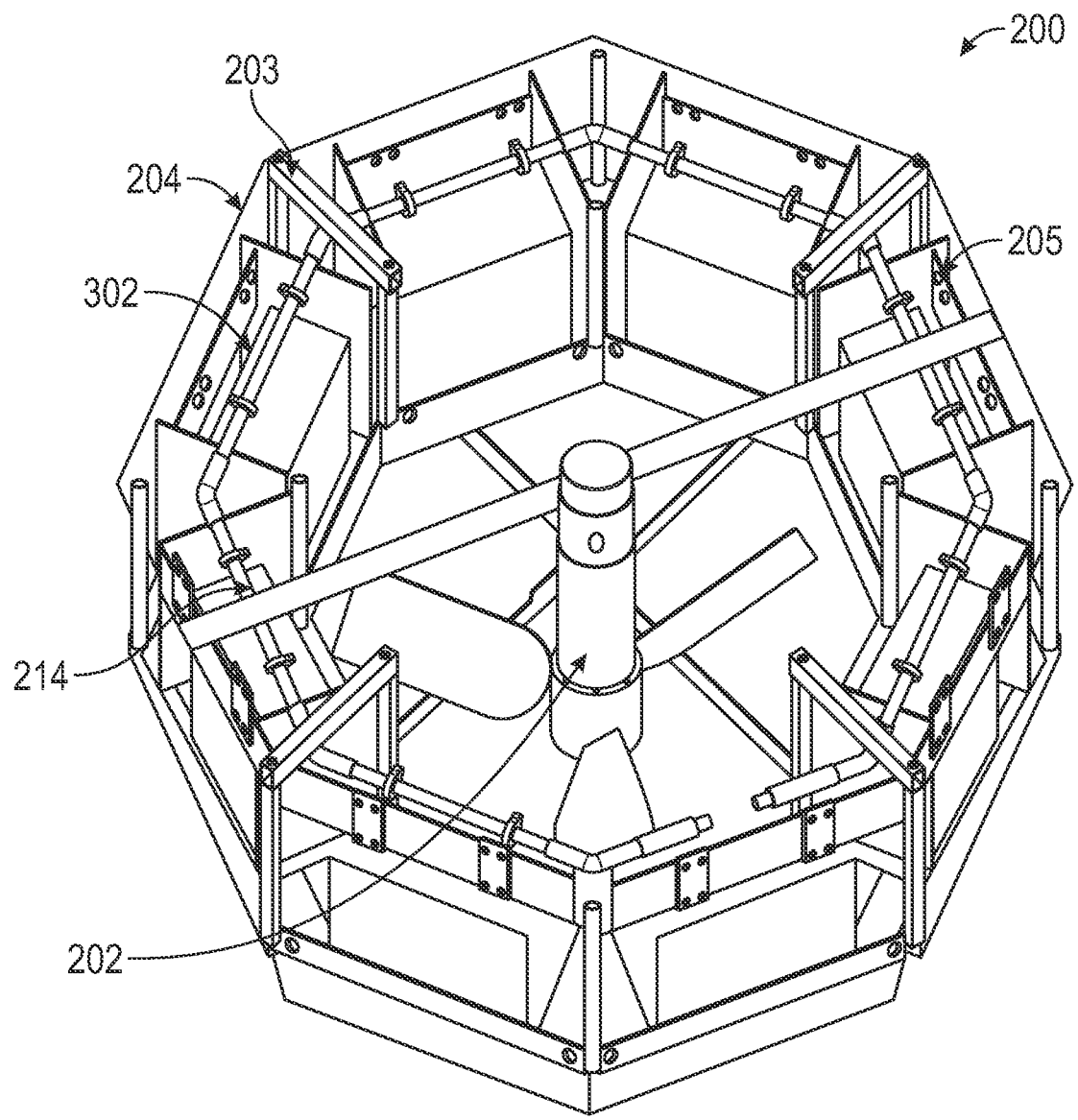

Cover 204 may be a cover that prevents air from being drawn in by the fan from across the surface upon which cover 204 is placed upon. In embodiments, cover 204 may be made from a metal material (e.g., aluminum, steel, copper, bronze, etc.), a plastic material, or a hybrid material. In embodiments, cover 204 may be non-transparent (as shown in FIG. 3) or may be transparent (as shown in FIG. 4). In embodiments, cover 204 may be octagonal, circular, rectangular, square, hexagonal, and/or any other shape. In embodiments, as shown in FIG. 3, an octagonal shape may allow for rectangular cuboid shaped pads 302 to be used. In alternate embodiments, a circular shaped cover 204 may allow for curved-shaped pads. In further alternate embodiments, cover 204 may include openings, passageways, slots of any shape, etc., that allow for air to enter from cover 204 and into circulation by fan 202 inside cooling device 200.

Trough 206 may be structure that may store liquid and may also provide for ducting of air exiting cooling device 200. In embodiments, trough 206 may be made from a metal material (e.g., aluminum, steel, galvanized steel, copper, bronze, etc.), a plastic material, or a hybrid material. In embodiments, trough 206 may be created by connecting multiple trough-shaped components. In alternate embodiments, trough 206 may be manufactured as one continuous structure. In embodiments, trough 206 may hold any liquid that may drip/move from pad 302 that has not evaporated. In embodiments, trough 206 may be used as a duct for incoming air to be forced through cooling device 200. In further embodiments, the shape of trough 206 allows for the dimension "S," as shown in FIG. 3, of cooling device 200 to be reduced and, thus, reducing the amount of space taken up by cooling device 200. While cover 204 and trough 206 may be separate manufactured components that connect together (as described in further figures), in alternate embodiments, cover 204 and trough 206 may be a single manufactured component. Connector 208 may connect cover 204 to trough 206.

In embodiments, connector 208 may be a t-slotted bar (e.g., 80/20 long or short) that fits into apertures (e.g., holes, openings, etc.) within cover 204 and trough 206. In alternate embodiments, connector 208 may be a non-slotted bar. In embodiments, cooling device 200 may be connected to a pump system. In embodiments, the pump system may be controlled by a computing device, as described in FIG. 13. In embodiments, the pump system may be a part of cooling device 200 or is remote from cooling device 200. In embodiments, the pump system may be a dry pump system. In embodiments, some of the liquid that is supplied to pads 302 may be transfer to trough 206. In embodiments, trough 206 may include a float valve, or other device, that detects the amount of liquid in trough 206. In embodiments, if the amount of liquid in trough 206 exceeds a certain threshold (e.g., by weight, by water level, by cubic feet, etc.), the pump may operate and provide liquid supply, via piping, to pads 302. In embodiments, the threshold may be determined by a measuring instrument attached to trough 206 and controlled by a computing device as described in FIG. 13. In embodiments, some of the liquid in trough 206 may be pumped out of trough 206 and redistributed back to pads 302. In embodiments, when the amount of liquid does not exceed a threshold, the pump may not operate and, accordingly, may not provide liquid to pads 302 via piping inside cooling device 200.

FIG. 4 shows another example diagram of cooling device 200. In FIG. 4, cover 204 may be manufactured from a transparent material and allows for the internal components that make up cooling device 200 to be visible from a particular perspective view. As shown in FIG. 4, cooling device 200 includes fan 202, bracket 203, plate 205, piping 214, cover 204, and pad 302. In embodiments, piping 214 is also described in further figures. In embodiments, bracket 203 may be used to connect cover 204 to trough 206 by using a connecting device (e.g., a rod). In embodiments, sensor 104 may be attached to cooling device 200.

Figure 5:
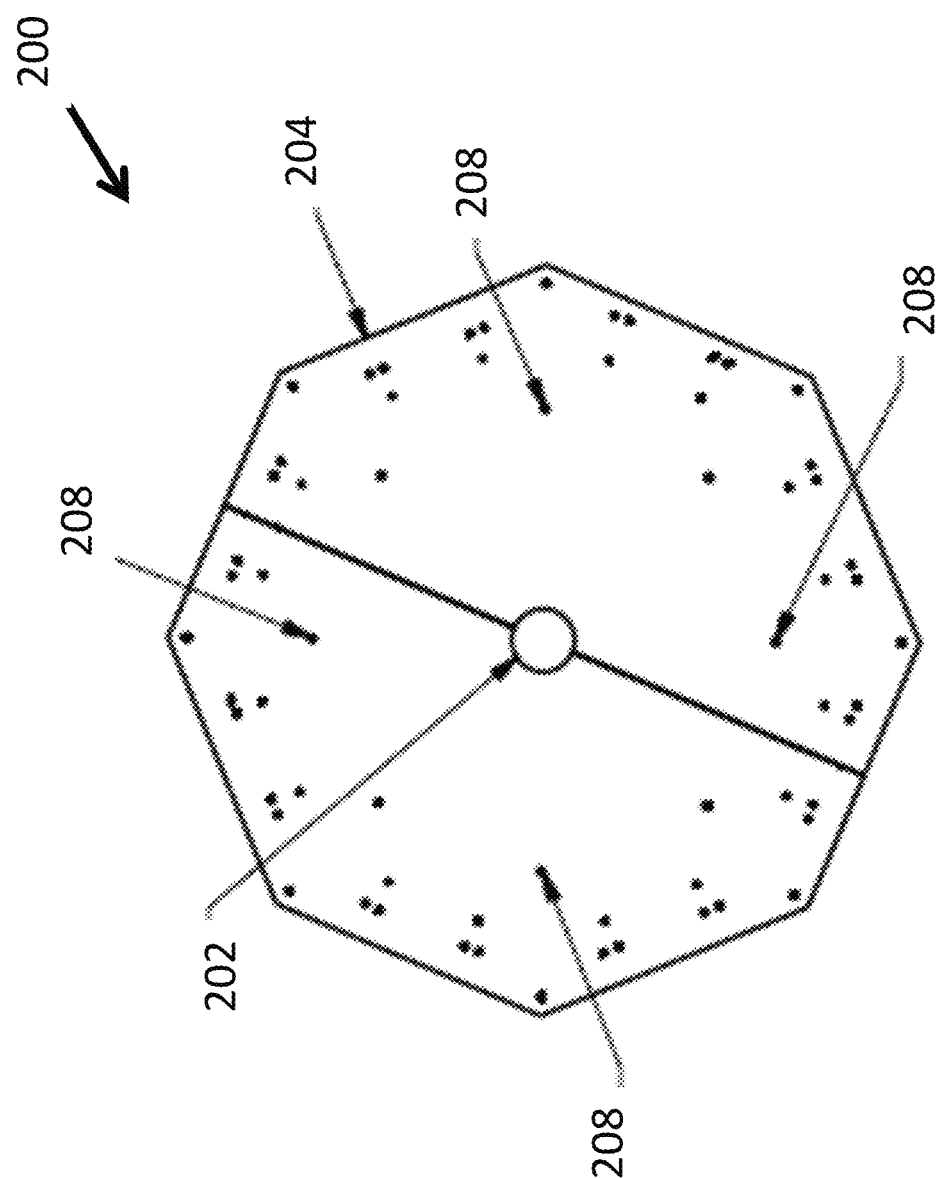
FIG. 5 is a view of an example cooling device.

FIG. 5 shows a view of cooling device 200 when being viewed from the side of cooling device 200 where cover 204 is located. From this view, the central hub of fan 202 is visible. In embodiments and from this view, connector 208 is also visible.

Figure 6:
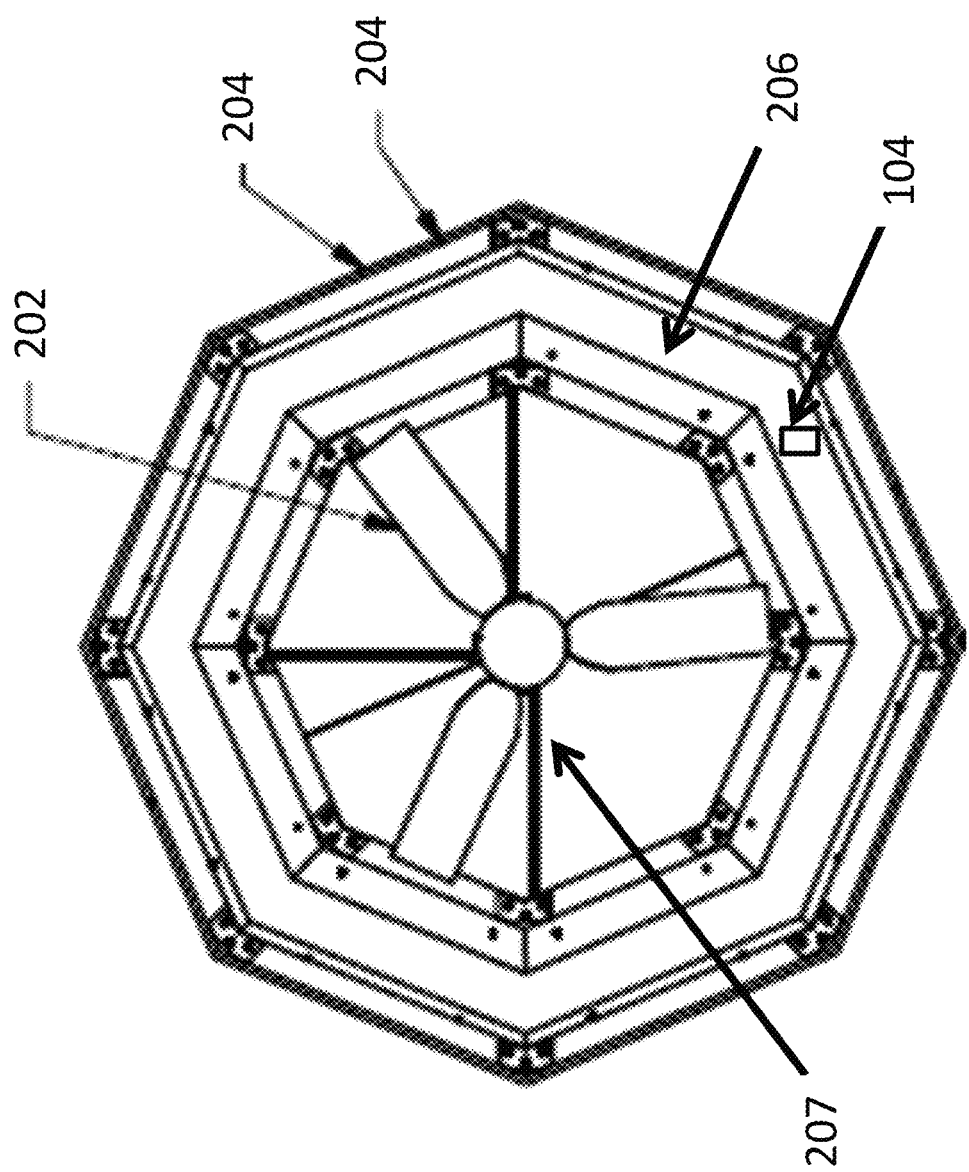
FIG. 6 is a view of an example cooling device.

FIG. 6 shows another view of cooling device 200 when being viewed from the area to which fan 202 will be forcing conditioned air. From this view, the blades of fan 202 are visible and a portion of cover 204 is visible when viewing from the side that shows the blades of the fan 202 that can circulate in a space created by trough 206 within cooling device 200. FIG. 6 also shows connecting rods 207. In embodiments, connecting rods 207 connect fan 202 to trough 206 to provide stability to fan 202 during rotation. In alternate embodiments, cooling device 200 may not have any connecting rods 207. In embodiments, sensor 104 may be attached to any portion of cooling device (e.g., the areas of cooling device 200 that are closed to the ground or other areas of cooling device 200) so that sensor 104 can determine occupancy of an area.

Figure 7A:
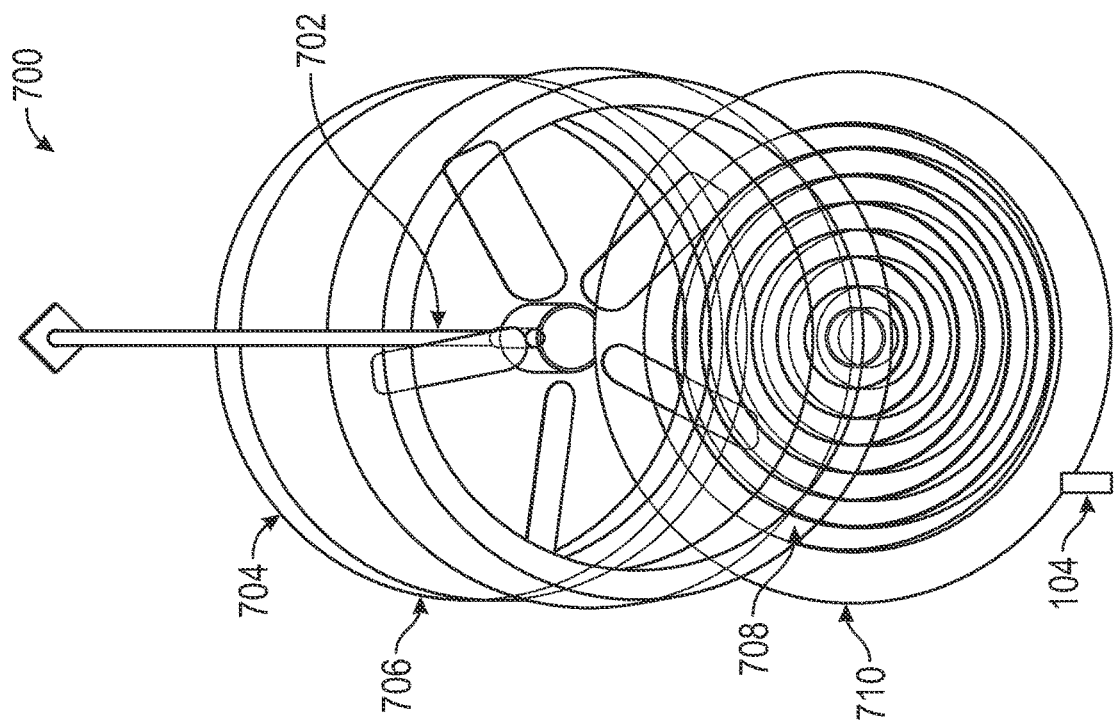
FIGS. 7A and 7B are diagrams of an example cooling device.
Figure 7B:
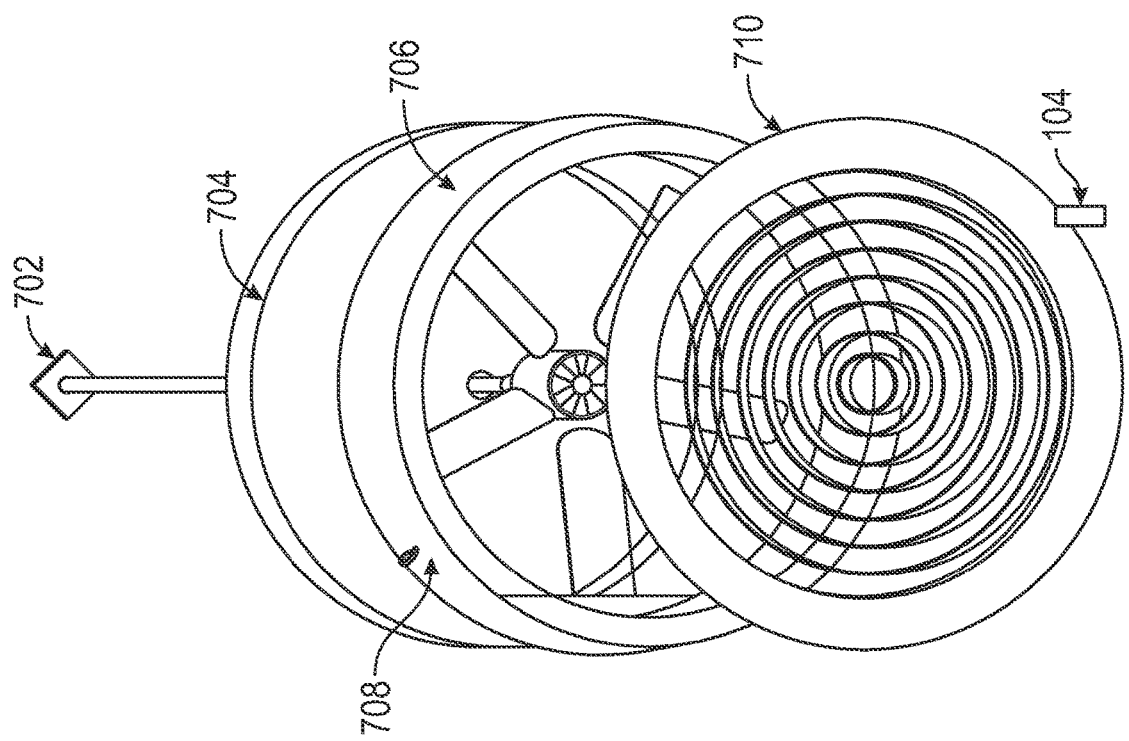

FIGS. 7A and 7B are diagram of an alternate embodiment of cooling device 200, cooling device 700. FIG. 7A is a perspective view of cooling device 200 from the ground and FIG. 7B is a perspective view of cooling device 200 from the ceiling. As shown in FIGS. 7A and 7B, cooling device 700 may include, sensor 104, a ceiling rod 702, shield 704, pad 706, float valve 708, and diffuser 710. In embodiments, ceiling rod 702 may allow for cooling device 700 to be connected to a ceiling directly or indirectly. In embodiments, shield 704 may cover pad 706 in a manner similar to pad cover 210 as described in previous figures.

In embodiments, pad 706 may provide liquid to airflow in a manner similar to pad 302 as described in previous figures. In embodiments, float valve 708 may be located in a trough-like structure, such as trough 206, as described in previous figures. In embodiments, diffuser 710 may connect to the bottom of cooling device 700 and provide a particular type of airflow distribution from cooling device 700 to the area surrounding cooling device 700.

Figure 8:
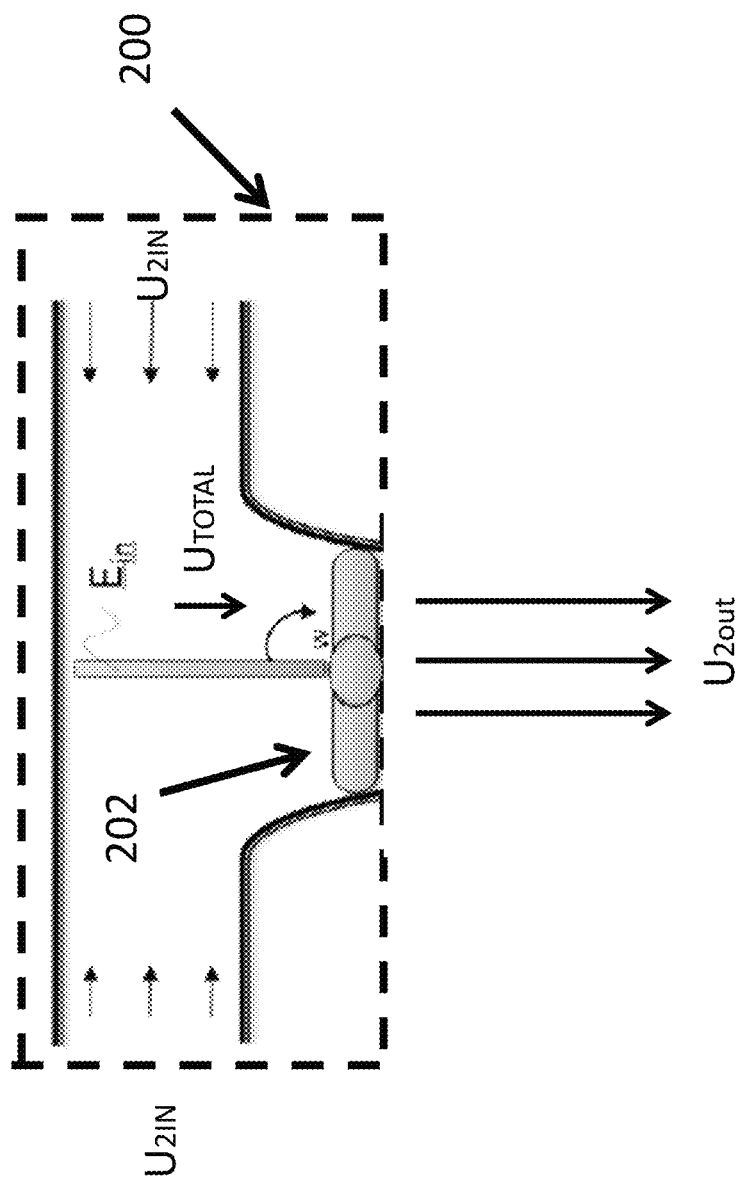
FIG. 8 is a schematic diagram of an example cooling device.

FIG. 8 is a schematic drawing of cooling device 200 and fan 202. In embodiments, FIG. 8 describes an incoming airflow velocity ($u_{2in}$), which is the air velocity that is exiting from a pad, such as the pad described in the previous figures, and outgoing airflow ($u_{2out}$) which is airflow velocity that is blown by fan 202 into an area. In embodiments, fan 202 may rotate at a given rotations per minute (RPM), input fan power ($E_{in}$), and at a given fan pitch to provide the desired outgoing airflow from fan 202. In embodiments, the shape of cover 204 and trough 206, described in earlier figures, may affect the incoming airflow velocity into fan 202 and the outgoing airflow velocity exiting from fan 202.

In embodiments, each incoming airflow associated with each incoming airflow velocity combines together ($U_{TOTAL}$) near or above fan 202, within the space created by combining cover 204 and trough 206, before then exiting fan 202 as an outgoing airflow ($u_{2out}$) associated with outgoing airflow velocity. In embodiments, the fan motor may be controlled by sensor 104 which may be communicating with a computing device, such as computing device 106 described in FIG. 2.

Figure 9:
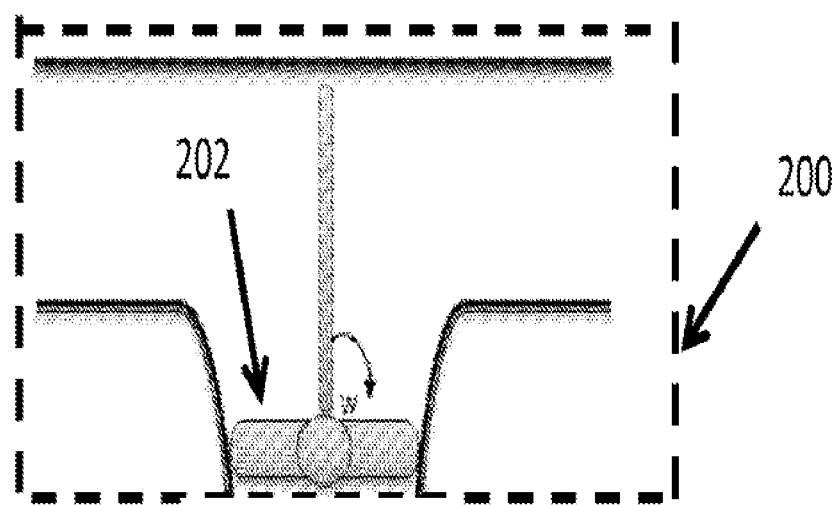
FIG. 9 is a schematic diagram of an example cooling device.

FIG. 9 is a schematic drawing of cooling device 200 and fan 202, similar to the schematic drawing in FIG. 8. In FIG. 9, sensor 104 may determine that there is no occupancy in a particular space where the cooling device and fan 202 are located within and control cooling device 200 and fan 202 to stop generating any outgoing airflow ($u_{2out}$). Furthermore, sensor 104 controls device 200 and fan 202 to not pull in any air ($u_{2in}$).

Figure 10:
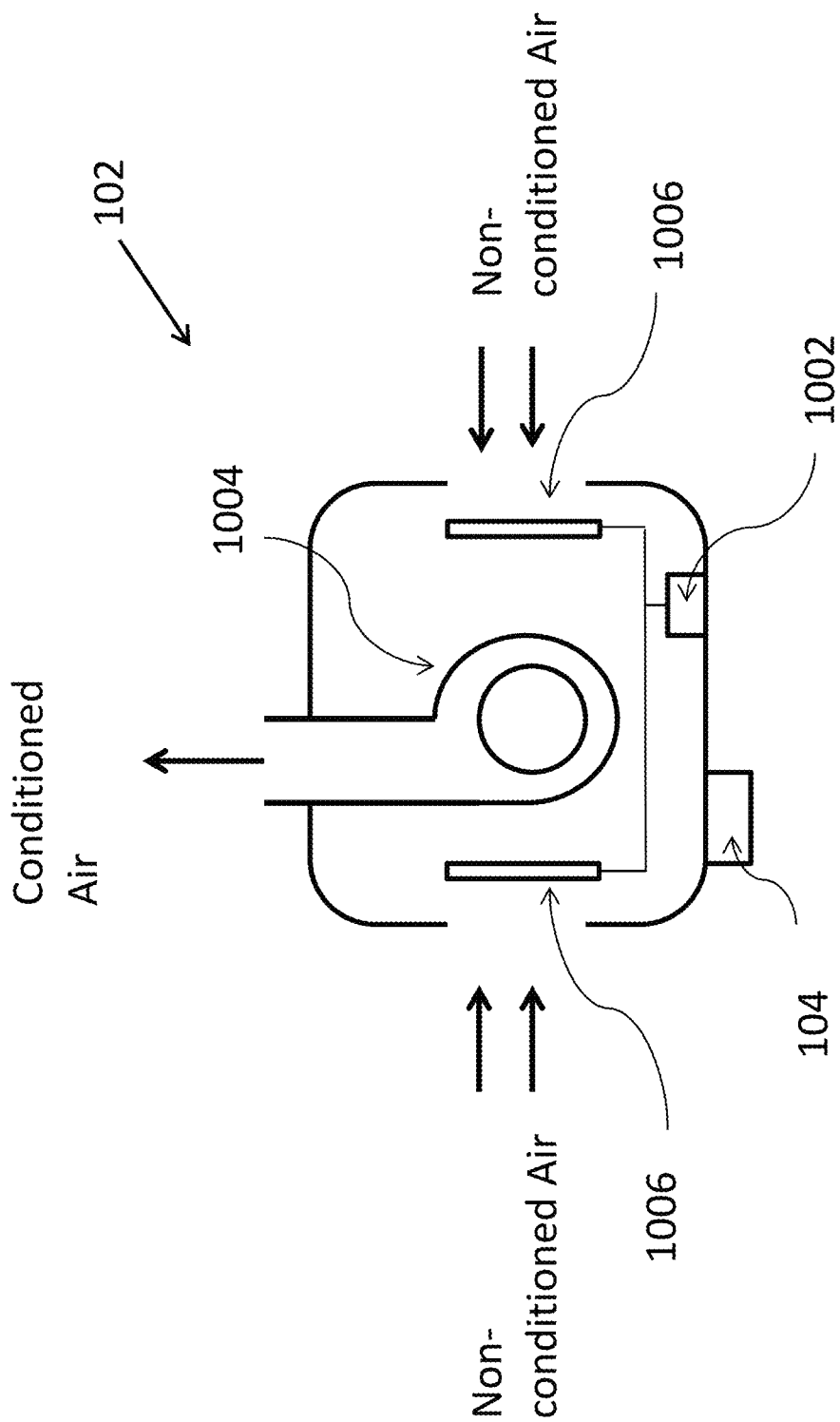
FIG. 10 is a diagram of an example cooling device.

FIG. 10 is a schematic diagram of evaporative cooling device 102. In embodiments, evaporative cooling device 102 includes sensor 104, recirculating pump 1002, blower 1004, and evaporative pad 1006. In embodiments, evaporative cooling device 102 may be located on the floor or ground. In alternate embodiments, evaporative cooling device 102 may be located on an elevated surface (e.g., on a pad, on top of a roof, etc.) that allows for evaporative cooling device 102 to operate. In embodiments, recirculating pump 1002 may receive a liquid (e.g., water) which is circulated (e.g., sprayed), via water lines, across evaporative pad 1006. In embodiments, non-conditioned air is drawn through evaporative pad 1006 and is reduced in temperature based on the evaporated liquid. In embodiments, blower 1004, when operating, blows the conditioned air into a particular area/space. In embodiments, blower 1004 is operated by a bower motor. In embodiments, when sensor 104 determines that a particular area is occupied, one or more communications may be sent to recirculating pump 1002 or blower 1004 (directly or via another device, such as computing device 106) that either allow recirculating pump 1002 or blower 1004 to continue operation or to stop operation.

Figure 11:
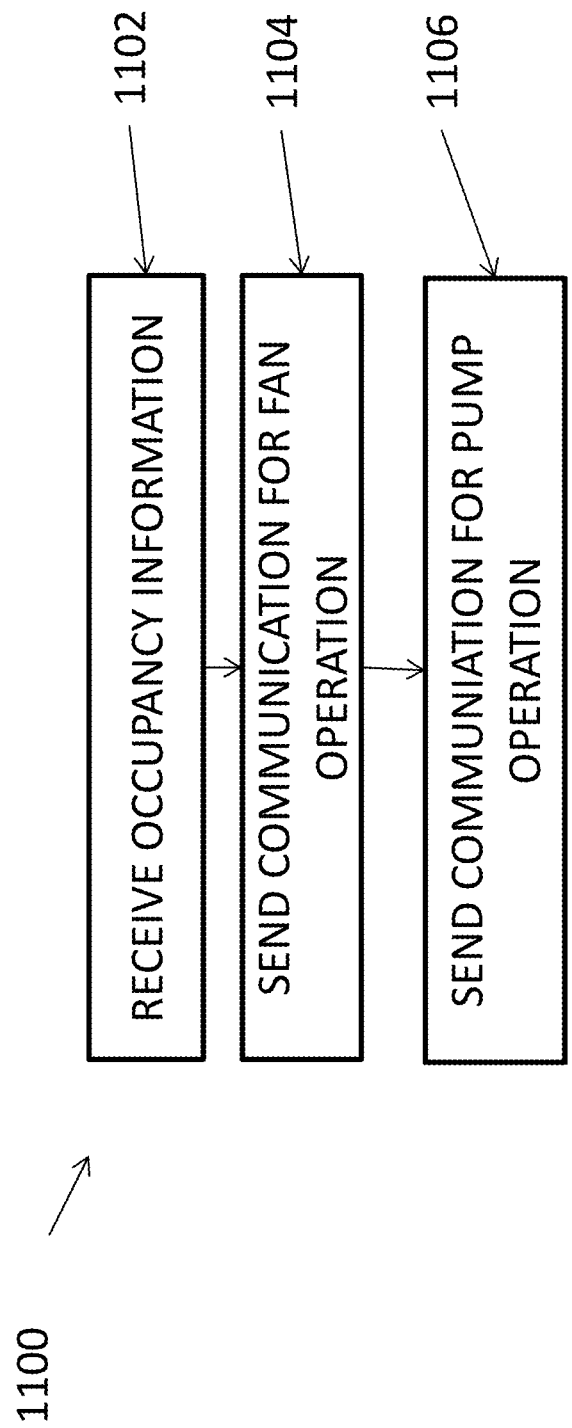
FIG. 11 is an example flow chart.

FIG. 11 is a flow chart of an example process 1100 for sending communications to a cooling device (e.g., cooling device 200 or evaporative cooling device 102). At step 1102, a sensor (e.g., sensor 104) may receive information about the occupancy of a particular area. In embodiments, the sensor may be located on a cooling device or may be located in a particular location of the area that is remote from the cooling device in the same area. In embodiments, the sensor may determine whether the particular area is occupied with living entities or not occupied with living entities. At step 1104, the sensor may send a communication to a fan (e.g., a fan 202 within cooling device 200 or ceiling fan 101) that includes information/instructions for the fan to operate or not to operate. In embodiments, if the sensor sends a communication to the fan to stop operating, there may be a time delay from the receipt of the communication and the actual operation of the fan stops. In alternate embodiments, if the sensor sends a communication to the fan to stop operating, the actual operation of the fan may stop upon receipt of the communication. At step 1106, the sensor may send a communication to a pump (e.g., pump associated with cooling device 200 or pump 1006 in evaporative cooling device 102). In embodiments, if the sensor sends a communication to the pump to stop operating, there may be a time delay from the receipt of the communication and the actual operation of the pump stops. In alternate embodiments, if the sensor sends a communication to the fan to stop operating, the actual operation of the pump may stop upon receipt of the communication.

While a series of steps have been described with regard to FIG. 11, the order of the steps may be modified in other implementations. Further, non-dependent steps may be performed in parallel. For example, steps 1104 and 1106 may occur at the same time.

Figure 12:
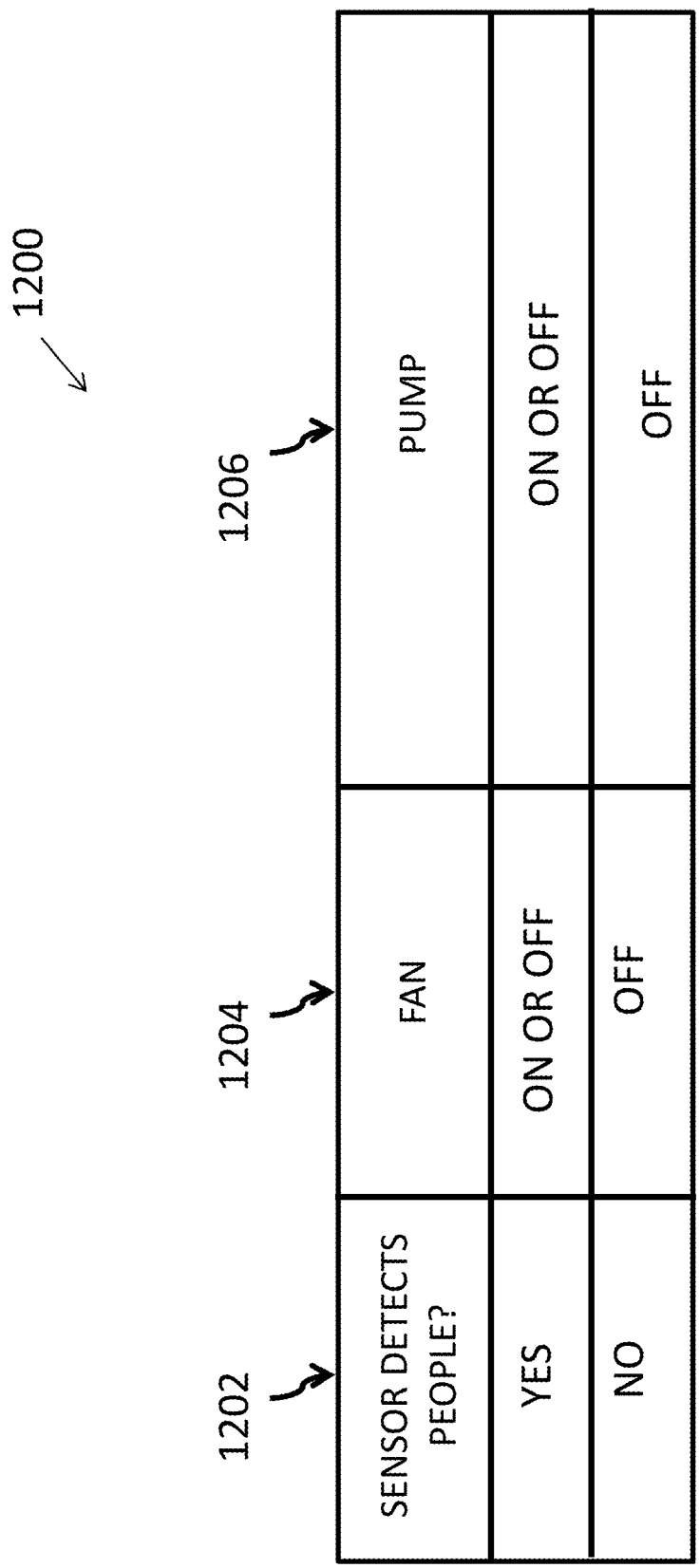
FIG. 12 is a diagram of an example data structure.

FIG. 12 describes an example data structure 1200 that stores occupancy information associated with sensor 104. In embodiments, data structure 1200 may include a collection of fields Occupancy 1202, Fan 1204, and Pump 1206. Although FIG. 12 shows example fields 1202-1206, in other embodiments, data structure 1200 may include fewer fields, different fields, additional fields, and/or differently arranged fields than depicted in FIG. 12. In embodiments, computing device 106 may store some or all of data structure 1200. Additionally, or alternatively, computing sensor 104 may store some or all of data structure 1200.

In embodiments, Occupancy 1202 is a field that stores information about whether there are any living entities (e.g., humans) occupying a particular space. As shown in FIG. 12, Occupancy 1202 can show that the particular area is occupied (YES) or not occupied (NO). In embodiments, a particular area is occupied or not occupied based on the amount of threshold time that has to be met to determine that the particular area is not occupied. In embodiments, Fan 1204 shows information about whether a fan, either ceiling fan 101 or a fan within cooling device 200, should be operating (ON) or not operating (OFF). In embodiments, Fan 1204 may determine whether the fan is operating based on programming instructions that determine whether the fan should be operating when a particular area is occupied. In embodiments, Pump 1206 shows whether a pump, as a part of cooling device 200 or evaporative cooling device 102, should be operating (ON) or not operating (OFF). In embodiments, Pump 1206 may determine whether the pump is operating based on programming instructions to a computing device (e.g., computing device 106 or sensor 104, determine whether the fan should be operating when a particular area is occupied. In embodiments, Fan 1204 and/or Pump 1206 may still include instructions to operate a fan and/or pump based on any override instructions. For example, a computing device (e.g., computing device 106) may determine that the humidity level and/or temperature level requires the fan and/or pump to continue to run even though an area is not occupied.

While the previous figures show pads 302, alternate embodiments of cooling device 200 may not include any pads. Instead, cooling device 200 may use an atomization process to distribute liquid within and around fan 202 within FIG. 2. In embodiments, atomization may be considered as a process of converting a liquid into very fine particles or droplets. Accordingly, in alternate embodiments, cooling device 200 may not include brackets 203. Instead, cooling device 200 may have piping 214 to include particularly sized nozzles that receive liquid (e.g. via a pump or other device) that, when exerted through openings in piping 214, result in the liquid being atomized. In embodiments, this results in atomized liquid being sprayed across fan 202. As a result, trough 206 may not hold any water as the liquid is atomized and transferred away from cooling device 200 by fan 202. Furthermore, occupancy of living entities includes occupancy of human beings or occupancy of other types of living entities (e.g., cows, sheep, monkeys, etc.).

Also while the previous figures and embodiments show fan 202 operating at the same time as a pump is providing liquid to pads 302, embodiments may have fan 202 operating only and no pump providing liquid to pads 302. In embodiments, an electronic switch (e.g., on cooling device 200, on a remote wireless controller to cooling device 200, etc.) may switch the operation of cooling device 200 so that it is only uses fan 202 and the pump is not operating to provide liquid to pads 302. In alternate embodiments, another electronic switch may open and close cover 204. Thus, for example, if only fan 202 is operating, and not the pump, cover 204 may be opened for additional air supply. Furthermore, while the preceding figures describe sensor 104 as turning on and off a device, it is understood that a device can also be turned on with a power switch and can also be turned off by terminating power to the device.

Figure 13:
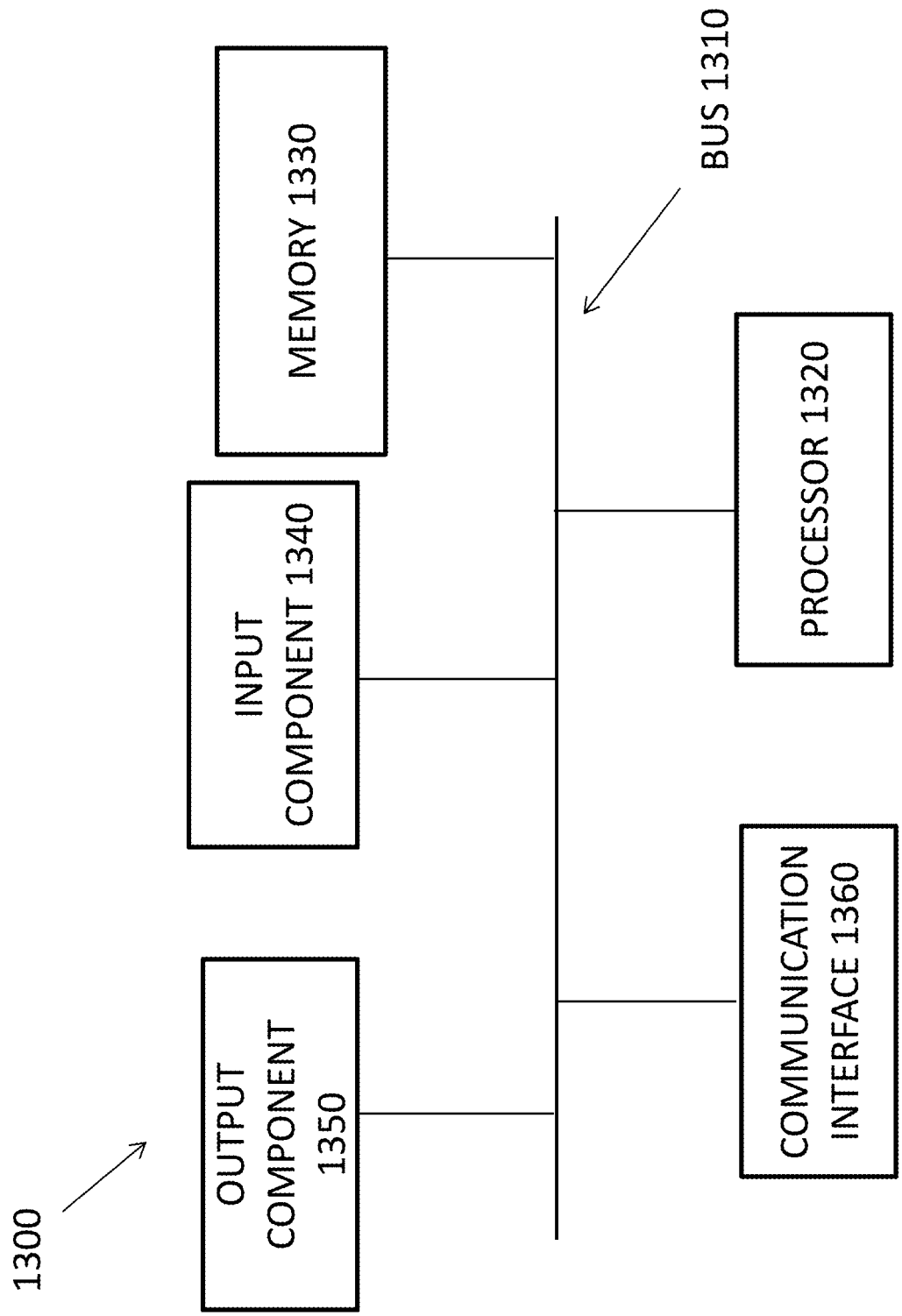
FIG. 13 is a diagram of an example computing device.

FIG. 13 is a diagram of example components of a cooling device 200. Device 1300 may correspond to computing devices that are part of sensor 104, cooling device 200 and/or a control system associated with cooling device 200. Alternatively, or additionally, fan 202 and/or the pump may include one or more devices 1300 and/or one or more components of device 1300.

As shown in FIG. 13, device 1300 may include a bus 1310, a processor 1320, a memory 1330, an input component 1340, an output component 1350, and a communications interface 1360. In other implementations, device 1300 may contain fewer components, additional components, different components, or differently arranged components than depicted in FIG. 13. Additionally, or alternatively, one or more components of device 1300 may perform one or more tasks described as being performed by one or more other components of device 1300.

Bus 1310 may include a path that permits communications among the components of device 1300. Processor 1320 may include one or more processors, microprocessors, or processing logic (e.g., a field programmable gate array (FPGA) or an application specific integrated circuit (ASIC)) that interprets and executes instructions. Memory 1330 may include any type of dynamic storage device that stores information and instructions, for execution by processor 1320, and/or any type of non-volatile storage device that stores information for use by processor 1320.

Input component 1340 may include a mechanism that permits a user to input information to device 1300, such as a keyboard, a keypad, a button, a switch, etc. Output component 1350 may include a mechanism that outputs information to the user, such as a display, a speaker, one or more light emitting diodes (LEDs), etc.

Communications interface 1360 may include any transceiver-like mechanism that enables device 1300 to communicate with other devices and/or systems. For example, communications interface 1360 may include an Ethernet interface, an optical interface, a coaxial interface, a wireless interface, or the like.

In another implementation, communications interface 1360 may include, for example, a transmitter that may convert baseband signals from processor 1320 to radio frequency (RF) signals and/or a receiver that may convert RF signals to baseband signals. Alternatively, communications interface 1360 may include a transceiver to perform functions of both a transmitter and a receiver of wireless communications (e.g., radio frequency, infrared, visual optics, etc.), wired communications (e.g., conductive wire, twisted pair cable, coaxial cable, transmission line, fiber optic cable, waveguide, etc.), or a combination of wireless and wired communications.

Communications interface 1360 may connect to an antenna assembly (not shown in FIG. 3) for transmission and/or reception of the RF signals. The antenna assembly may include one or more antennas to transmit and/or receive RF signals over the air. The antenna assembly may, for example, receive RF signals from communications interface 1360 and transmit the RF signals over the air, and receive RF signals over the air and provide the RF signals to communications interface 1360. In one implementation, for example, communications interface 1360 may communicate with a network (e.g., wireless network, Internet, Intranet, etc.).

As will be described in detail below, device 1300 may perform certain operations. Device 1300 may perform these operations in response to processor 1320 executing software instructions (e.g., computer program(s)) contained in a computer-readable medium, such as memory 1330, a secondary storage device (e.g., hard disk, CD-ROM, etc.), or other forms of RAM or ROM. A computer-readable medium may be defined as a non-transitory memory device. A memory device may include space within a single physical memory device or spread across multiple physical memory devices.

The software instructions may be read into memory 1330 from another computer-readable medium or from another device. The software instructions contained in memory 1330 may cause processor 1320 to perform processes described herein. Alternatively, hardwired circuitry may be used in place of or in combination with software instructions to implement processes described herein. Thus, implementations described herein are not limited to any specific combination of hardware circuitry and software.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A cooling device, comprising:
    a trough;
    a fan located above the trough;
    multiple brackets connected to the trough, wherein,
        each of the multiple brackets has a first leg and a second leg,
            wherein the first leg is attached to a first plate and a second plate,
                wherein the first leg of each of the multiple brackets is closer to the fan than:
                a front edge of the first plate, and
                a front edge of the second plate,
                    wherein the front edge of the first plate and the front edge of the second plate do not connect with the first leg of each of the multiple brackets;
    piping sections,
        wherein, the piping sections are placed within grooves located on a top edge of the first plate and the second plate; and
    multiple pads,
        wherein the multiple pads are located entirely below the piping sections.

2. The cooling device of claim 1, wherein each of the multiple brackets include a top part that connects to the first leg and the second leg, wherein the piping sections are below the top part of each of the multiple brackets.

3. The cooling device of claim 1, wherein none of the multiple brackets connect to each other.

* * * * *